US008757666B1

(12) United States Patent
Santore

(10) Patent No.: US 8,757,666 B1
(45) Date of Patent: Jun. 24, 2014

(54) ATTACHABLE DRY ERASE SHOPPING LIST

(71) Applicant: Rebecca Santore, Willmington, DE (US)

(72) Inventor: Rebecca Santore, Willmington, DE (US)

( * ) Notice: Subject to any disclaimer, the term of this patent is extended or adjusted under 35 U.S.C. 154(b) by 58 days.

(21) Appl. No.: 13/682,998

(22) Filed: Nov. 21, 2012

(51) Int. Cl.

| | |
|---|---|
| ***B42D 9/00*** | (2006.01) |
| ***B60R 7/00*** | (2006.01) |
| ***B42D 5/00*** | (2006.01) |
| ***B43L 3/00*** | (2006.01) |
| ***B42F 1/02*** | (2006.01) |
| ***B42F 1/04*** | (2006.01) |
| ***B42F 9/00*** | (2006.01) |

(52) U.S. Cl.
CPC ................ *B42D 5/005* (2013.01); *B43L 3/008* (2013.01); *B42F 1/02* (2013.01); *B42F 1/04* (2013.01); *B42F 9/001* (2013.01)
USPC ............................................ 281/42; 224/411

(58) Field of Classification Search
CPC .......... B42D 5/005; B42D 3/008; B42D 1/02; B42D 1/04; B42D 9/001
USPC ............................................ 281/42; 224/411
See application file for complete search history.

(56) References Cited

U.S. PATENT DOCUMENTS

| | | | | |
|---|---|---|---|---|
| 3,881,267 | A | 5/1975 | Hicks | |
| 4,496,058 | A | 1/1985 | Harris et al. | |
| D301,489 | S * | 6/1989 | Aquila et al. | D19/88 |
| 4,848,117 | A | 7/1989 | Welborn et al. | |
| D313,629 | S * | 1/1991 | Hoffman | D19/88 |
| 5,086,960 | A | 2/1992 | Schwietzer | |
| 5,566,609 | A * | 10/1996 | Kirschner | 108/42 |
| 6,000,610 | A * | 12/1999 | Talbott et al. | 235/383 |
| 6,250,006 | B1 * | 6/2001 | Berrier | 40/308 |
| 6,299,119 | B1 * | 10/2001 | Dunning | 281/44 |
| 7,219,822 | B2 | 5/2007 | Chretien et al. | |
| 2004/0069918 | A1 * | 4/2004 | McKinney | 248/274.1 |

* cited by examiner

*Primary Examiner* — Kyle Grabowski
(74) *Attorney, Agent, or Firm* — Robert C. Montgomery; Montgomery Patent & Design

(57) ABSTRACT

A clipboard for keeping lists of items for purchases is described. The clipboard includes a dry-erase board, a paper pad, a holder for a dry-erase marker, a holder for an ink pen, a plurality of magnets for holding the clipboard to a ferromagnetic surface, and a folding board having a clip for attaching to the clipboard to a shopping cart handled. The clip is configured to enable tilting the clipboard with mounted on a shopping cart handle. The clipboard can be moved from a refrigerator, carried to a store, and then clipped onto a shopping cart.

20 Claims, 5 Drawing Sheets

ATTACHABLE DRY ERASE SHOPPING LIST

RELATED APPLICATIONS

There are no current co-pending applications.

FIELD OF THE INVENTION

The presently disclosed subject matter is directed to note-taking devices. More particularly, the present invention relates to a dry-erase board/paper pad for facilitating listing and purchasing of grocery items and that is movable from ferro-magnetic surfaces to a grocery cart handle.

BACKGROUND OF THE INVENTION

Many households employ a variety of different methods of keeping track of items to be purchased at a grocery store. Some people rely upon a detailed list kept on a piece of paper. However, such paper can be easily lost or misplaced. Others rely upon memory, which leads to purchasing items that are not needed or forgetting to purchase items that are. Others rely on dry-erase boards that are kept in the kitchen and which allow adding items to be purchased to a list. However, dry-erase boards usually require a shopper to transfer notes to a piece of paper before going to the store. This obviously takes additional time and can result in transcription errors.

Accordingly, there exists a need for a means by which grocery store lists can be easily updated at home then used at the store. Preferably such a means would be directly movable from a fixed location such as on a refrigerator onto a shopping cart. Ideally a device would not require memory, would not require re-writing items to be purchased, would provide a stable writing surface, and could simply be wiped clean when done or as items are collected.

SUMMARY OF THE INVENTION

The principles of the present invention provide for a dry-erase board with a paper pad that can be easily updated at home and then used at the store. The dry-erase board with a paper pad can be directly moved from a fixed location such as on a refrigerator onto a shopping cart. The dry-erase board with a paper pad does not require memory, does not require re-writing items to be purchased, provides a stable writing surface, and can simply be wiped clean when done or as items are collected.

The principles of the present invention provide for a clipboard having both a dry-erase board and a pad of paper and which is held within a frame. The clipboard incorporates magnets for sticking to a ferro-magnetic surface such as a refrigerator and a shopping cart clip for attaching to the handle of a shopping cart. The frame has a slot for a conventional dry-erase marker and another for a pen or pencil. A user writes down grocery items that need to be purchased during the next store visit either on the dry-erase board or on the pad of paper. When going shopping the clipboard is removed from the metallic surface, carried to a store, and then snapped onto the handle of a common shopping cart using the shopping cart clip. The shopping cart clip is configured to rotate on the shopping cart handle from ninety to one hundred-eighty degrees (90°-180°). As the user collects items on the list the items can be crossed off or erased.

A clipboard that is in accord with the present invention includes a dry-erase board having a retention clip, an upper board connected to the dry-erase board by a board hinge, a holder on the dry-erase board for retaining a marker, a cart clamp attached to the top of the upper board, a cart clamp magnet mounted to the cart clamp, and a central magnet that is attached to the rear of the dry-erase board. The central magnet is located and configured such that it sticks to the cart clamp magnet when the upper board is pivoted fully backward on the board hinge.

Beneficially the retention clip retains at least one (1) piece of paper; the marker holder is beneficially comprised of back-to-back tubular members and includes a holder for retaining an ink pen. Preferably the dry-erase board includes a plurality of rear surface magnets. Also preferably the upper board is trapezoidal-shaped, the cart clamp includes a stationary clamping jaw, a movable clamping jaw that is attached to the stationary clamping jaw by a clamp hinge, and at least one (1) clamp spring that biases the movable clamping jaw toward the stationary clamping jaw. The clamp spring may be an internal torsion spring while the cart clamp may include an integral cart clamp actuator for rotating the movable clamping jaw away from the stationary clamping jaw. The clamping jaws should have inner gripping surfaces and the movable clamping jaw and the stationary clamping jaw may be dimensioned to clamp onto a shopping cart handle.

An alternative clipboard that is in accord with the present invention includes a dry-erase board having a board clip for retaining at least one (1) piece of paper, an upper board that is connected to the dry-erase board by a board hinge, a marker holder that is attached to the dry-erase board, a cart clamp that is attached to the top of the upper board, a cart clamp magnet that is mounted on the back of the cart clamp, and a central magnet attached to the rear of the dry-erase board. The central magnet is located and configured such that the central magnet sticks to the cart clamp magnet when the upper board is pivoted fully backwards.

Beneficially the marker holder is beneficially comprised of back-to-back tubular members that are dimensioned to retain a dry-erase marker and an ink pen. Preferably the dry-erase board includes a plurality of rear surface magnets. Also preferably the upper board is trapezoidal-shaped, the cart clamp includes a stationary clamping jaw, a movable clamping jaw that is attached to the stationary clamping jaw by a clamp hinge, and at least one clamp spring that biases the movable clamping jaw toward the stationary clamping jaw. The clamp spring may be an internal torsion spring while the cart clamp may include an integral cart clamp actuator for rotating the movable clamping jaw away from the stationary clamping jaw. The clamping jaws may be dimensioned to clamp onto a shopping cart handle.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | clipboard |
| 20 | dry-erase board |
| 22 | paper clip |
| 23 | actuator lever |
| 25a | marker holder |
| 25b | pen holder |
| 27 | marker |
| 29 | pen |
| 31 | pad of paper |
| 40 | upper board |
| 42 | board hinge |
| 44 | cart clamp |
| 46 | first clamp jaw |
| 47 | second clamp jaw |
| 49 | gripping surface |
| 52 | cart clamp actuator |
| 53 | spring |
| 54 | cart clamp hinge |
| 60a | cart clamp magnet |
| 60b | central magnet |
| 62 | surface magnet |
| 95 | refrigerator |
| 100 | shopping cart handle |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

Figure 1:
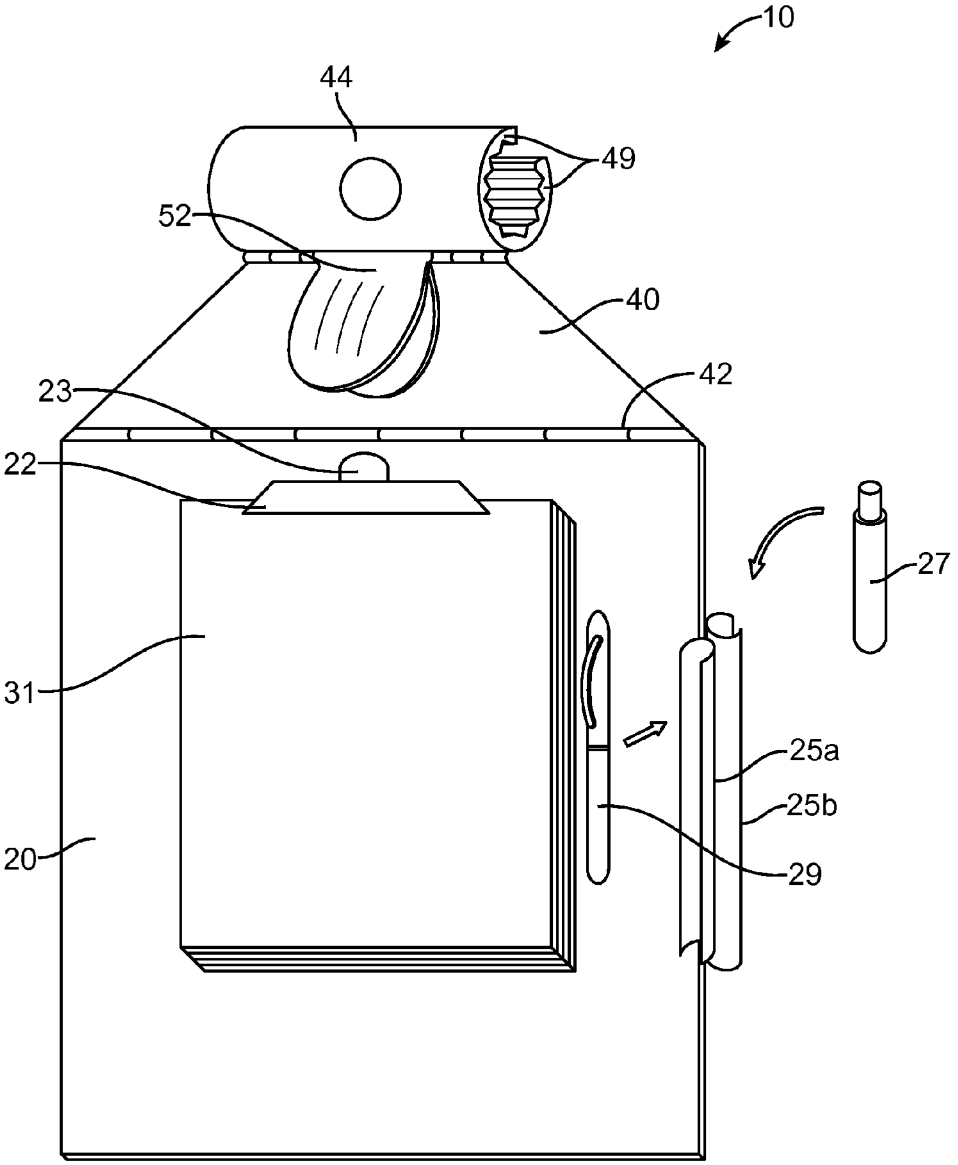
FIG. 1 is a front perspective view of an clipboard 10 that is in accord with a preferred embodiment of the present invention.
Figure 2A:
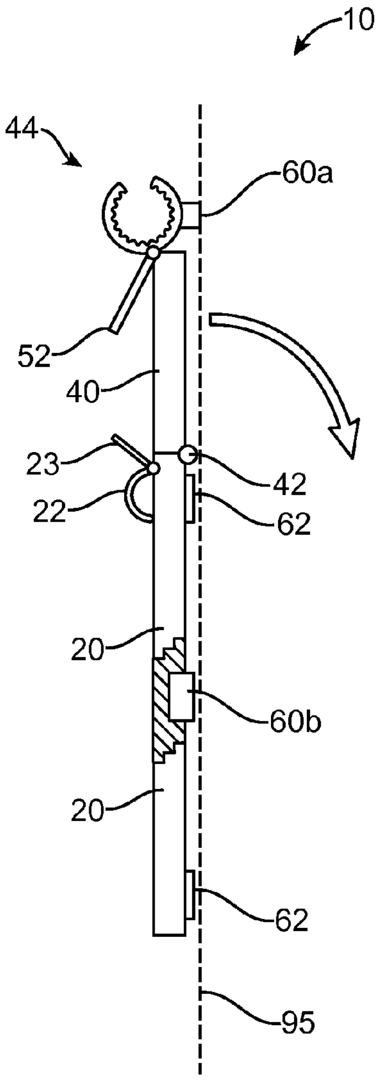
FIG. 2*a* is a side view of the clipboard 10 shown in FIG. 1 on a refrigerator 95.
Figure 2B:
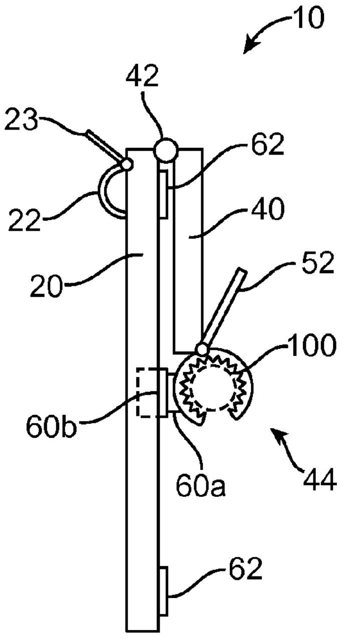
FIG. 2*b* is another side view of the clipboard 10 shown in FIG. 1 but attached to a shopping cart handle 100.
Figure 3A:
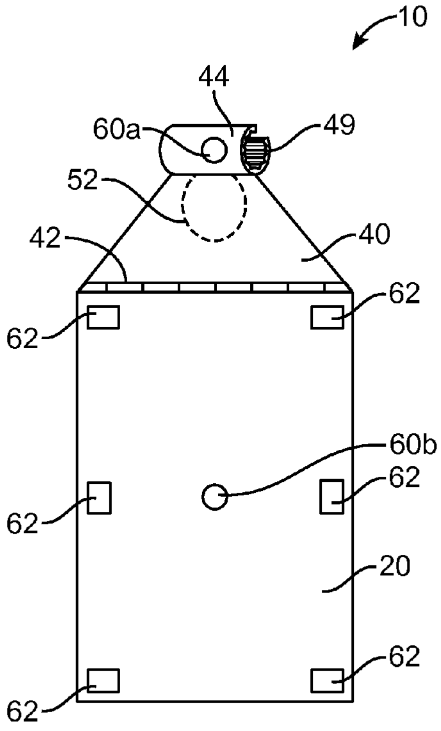
FIG. 3*a* is a rear view of the clipboard 10 of FIG. 1 configured to attach to a refrigerator.
Figure 3B:
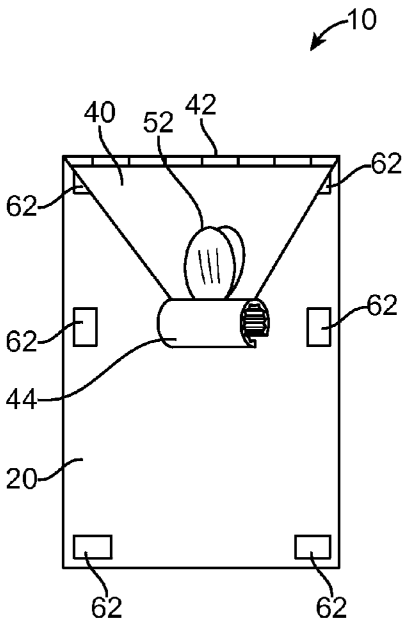
FIG. 3*b* is a rear view of the clipboard 10 configured to attach to a shopping cart handle 100.

FIG. 1 presents a front view of the preferred embodiment of the present invention, an attachable clipboard 10. The clipboard 10 can be selectively configured to attach to a refrigerator or other ferro-magnetic surface and to a shopping cart 100 (see FIG. 5). The clipboard 10 provides both a flat dry-erase board 20 and a pad of paper 31. As notations to purchased items can be made to either or both the dry-erase board 20 and the pad of paper 31 the clipboard 10 is highly useful for facilitating the purchasing of groceries and the like.

Still referring to FIG. 1, the clipboard 10 also includes a dry-erase marker 27 and an ink pen 29. The dry-erase marker 27 and the ink pen 29 respectively attach to the dry-erase board 20 via a marker holder 25*a* and a pen holder 25*b*. The marker holder 25*a* and the pen holder 25*b* are attached to the outer edge of the dry-erase board 20 and are beneficially configured as back-to-back plastic tubular members that are dimensioned to respectively hold the marker 27 and the pen 29 until needed. In practice the marker holder 25*a* and the ink holder 25*b* will be adhesively bonded to or otherwise permanently affixed to the outer edge of the dry-erase board 20.

Still referring to FIG. 1, the clipboard 10 includes a hinged, trapezoidal-shaped upper board 40 that is hinged to the dry-erase board 20 by a board hinge 42. The board hinge 42 is configured such that the upper board 40 can fold back to meet with the dry-erase board 20. As described in more detail subsequently the upper board 40 is configured to enable quick conversion from a refrigerator-mounted device to a shopping cart attachable device.

Turn now to FIGS. 2*a*, 2*b*, 3*a*, and 3*b*, respectively two side views, a rear view, and a front view of the clipboard 10. As shown the upper board 40 includes a cart clamp 44 having a cart clamp magnet 60*a* on its rear surface. The dry-erase board 20 includes a central magnet 60*b* that is located on the back of the dry-erase board 20. The cart clamp magnet 60*a* and the central magnet 60*b* are located and configured such that when the upper board 40 is folded all the way back on the board hinge 42 that the cart clamp magnet 60*a* sticks to the central magnet 60*b*. In addition, the dry-erase board 20 includes a plurality of surface magnets 62 that are located around the outer edges of the dry-erase board 20. The magnets 60*a*, 60*b*, 62 provide coincident magnetic adhesion to an existing refrigerator 95 or other ferro-magnetic surface.

During use, a user magnetically attaches the clipboard 10 to the refrigerator 95 using the magnets 60*a*, 60*b*, 62 to enable listing various grocery or other store items to be purchased on the dry-erase board 20. When a user goes to the store the clipboard 10 is removed from the refrigerator 95, the upper board 40 is pivoted back on the board hinge 42 until the cart clamp magnet 60*a* and the central magnet 60*b* stick together. This retains the upper board 40 such that the integral cart clamp 44 is behind the dry-erase board 20. The clipboard 10 is then taken to the store and attached to the handle of a shopping cart 100 using the cart clamp 44 (described in more detail subsequently). After shopping the clipboard 10 is wiped clean and the process starts over again. The magnets 60*a*, 60*b*, 62 are preferably adhesively bonded to the clipboard 10.

The clipboard 10 also enables a user to create a written grocery list using the pen 29 and the pad of paper 31. To that end the clipboard 10 includes a metal or plastic paper clip 22 that is integrally-molded or otherwise permanently attached to the front of the dry-erase board 20, just below the upper board hinge 42. The paper clip 22 can clamp a single sheet or an entire pad of paper 31. This allows a user to make notes of items in a similar manner as the previously described dry-erase board 20 and marker 27. The paper clip 22 uses a common spring-type hinge and has an outwardly-extending paper clip actuator lever 23 which enables loading/unloading the paper 31.

The dry-erase board 20 and the upper board 40 are envisioned as being made using injection-molded plastic materials and plastic or metal clamps and hinges. The dry-erase board 20 and the upper board 40 are envisioned as being available in various attractive colors. Beneficially the dry-erase board 20 is approximately twelve inches (12 in.) wide and eighteen inches (18 in.) long. Furthermore, while the previously approximated size of the clipboard 10 is preferred it should be understood that the dry-erase board 20 and the upper board 40 may be made available in various length and width sizes. Thus the preferred size should not be interpreted as a limiting factor of the clipboard 10.

Figure 4:
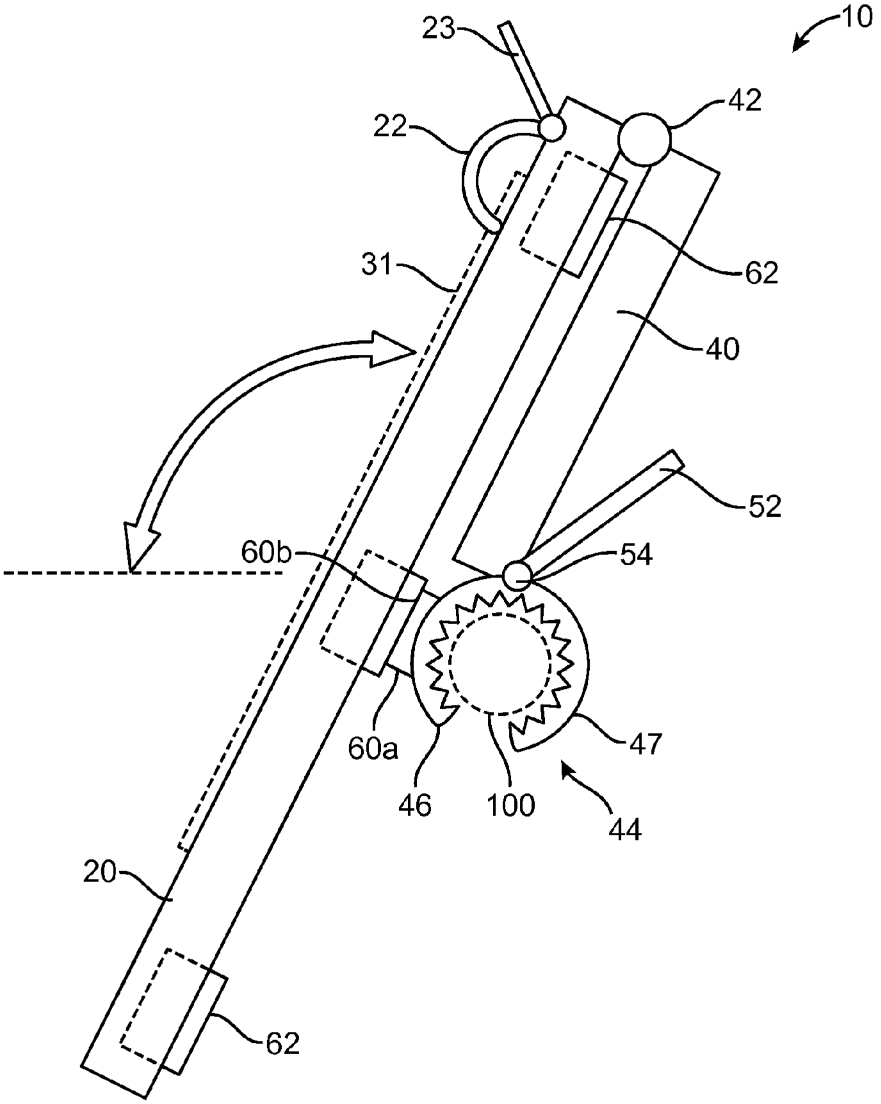
FIG. 4 is a side view of a cart clamp 44 used with the clipboard 10 shown in FIG. 1; and, FIG. 5 is a close-up view of the cart clamp 44 shown in FIG. 4.
Figure 5:
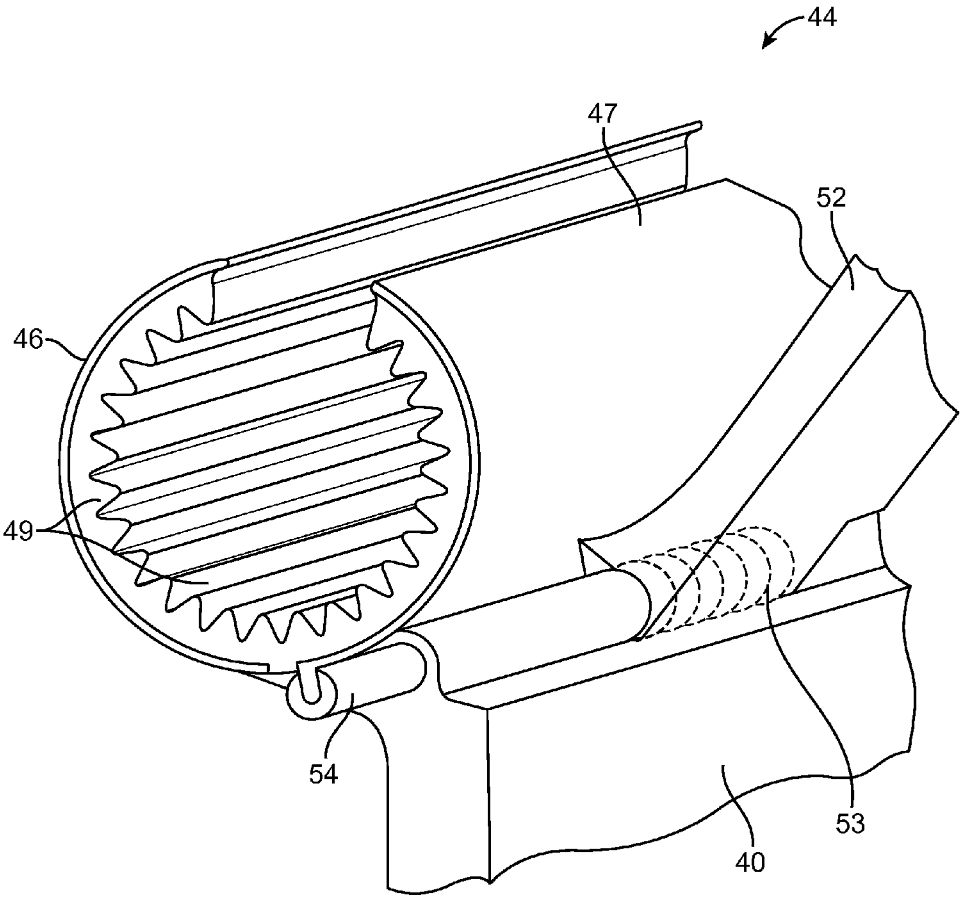

FIGS. 4 and 5 provide close-up views of the cart clamp 44. The cart clamp 44 is a spring-loaded clamping device having an arcuate first clamp jaw 46 and a second clamp jaw 47. The first clamp jaw 46 is a stationary-mounted member that is beneficially integrally-molded with the upper board 40. The second clamp jaw 47 is a rotating member that is affixed to the first clamp jaw 46 by a joining cart clamp hinge 54. The cart clamp hinge 54 is biased-closed via at least one (1) internal torsion spring 53. The cart clamp 44 may be opened by a user by applying force to the protruding integral cart clamp actuator 52. This causes the second clamp jaw 47 to rotate away from the first clamp jaw 46, allowing the cart clamp 44 to attach to a shopping cart handle.

The jaws 46, 47 of the cart clamp 44 have inner gripping surfaces 49 (see FIG. 5) beneficially comprised of an adhesively bonded rubber or soft plastic textured contact layer that provides a high-friction grip for the cart clamp 44 on the shopping cart handle. The cart clamp 44 may be selectively rotated on the shopping cart handle 100 during installation prior by releasing the cart clamp actuator 52. This can be used to provide a desired viewing or writing angle, reference FIG. 4. As the user walks through the store he simply marks off shopping items as they are added to the cart.

It is envisioned that other styles and configurations of the present invention can be easily incorporated into the teachings of the present invention, and while only one particular configuration is shown and described that is for purposes of clarity and disclosure and not by way of limitation of scope.

The preferred embodiment of the present invention can be used by a common user in a simple and effortless manner with little or no training. After initial purchase or acquisition of the clipboard 10 it would be installed as indicated in FIGS. 1 and 4.

The method of installing and using the clipboard 10 may be achieved by performing the following steps: procuring a model of the clipboard 10 having a desired color and a dry-erase board 20 with a desired size; pivoting the upper board 40 to an upward and coplanar position; attaching the clipboard 10 to a refrigerator 95 using the magnets 60*a*, 60*b*, 62; installing the marker 27 and pen 29 into the respective holders 25*a*, 25*b*; noting various grocery and other items which need to be purchased on the dry-erase board 20 using the dry-erase marker 27; removing the clipboard 10 from the refrigerator 95 by detaching the magnets 60*a*, 60*b*, 62.

Next, preparing the clipboard 10 for attachment to a handle by pivoting the upper board 40 back and down until the cart clamp magnet 60*a* and the central magnet 60*b* stick to each other; pressing the cart clamp actuator 52 to open the cart clamp 44; lowering the jaws 46, 47 of the cart clamp 44 around the handle; pivoting the clipboard 10 upward and downward to obtain a desired writing/reading angle of the dry-erase board 20; releasing the cart clamp actuator 52 to secure the clipboard 10 to the handle; checking-off or erasing items written upon the dry-erase board 20 as they are added to the cart until all items have been gathered.

The method of using the paper 31 and ink pen 29 of the clipboard 10 to create a hand-written list may be achieved by performing the following steps: securing paper 31 onto the dry-erase board 20 by inserting and clamping the paper 31 into the paper clip 22; affixing the clipboard 10 to the refrigerator 95 as previously described; writing down various grocery and other items onto the paper 31 using the pen 29; removing the clipboard 10 from the refrigerator 95; and, using the clipboard 10 on a cart handle to enhance shopping as previously described.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A clipboard, comprising:

a dry-erase board having a retention clip;

an upper board connected to said dry-erase board by a board hinge;

a marker holder on said dry-erase board for retaining a dry-erase marker;

a cart clamp attached to the top of said upper board;

a cart clamp magnet mounted to said cart clamp; and, a central magnet attached to the rear of said dry-erase board, said central magnet being located and configured such that said central magnet sticks to said cart clamp magnet when said upper board is pivoted fully backward on said board hinge.

2. The clipboard according to claim 1, wherein said retention clip retains at least one piece of paper on said dry-erase board.

3. The clipboard according to claim 2, wherein said marker holder further includes an ink pen holder for retaining an ink pen.

4. The clipboard according to claim 3, wherein said marker holder is comprised of back-to-back tubular members.

5. The clipboard according to claim 1, further including a plurality of surface magnets on said rear of said dry-erase board.

6. The clipboard according to claim 1, wherein said upper board is trapezoidal-shaped.

7. The clipboard according to claim 6, wherein said cart clamp includes a stationary clamping jaw, a movable clamping jaw attached to said stationary clamping jaw by a clamp hinge, and at least one clamp spring biasing said movable clamping jaw toward said stationary clamping jaw.

8. The clipboard according to claim 7, wherein said at least one clamp spring is an internal torsion spring.

9. The clipboard according to claim 8, wherein said cart clamp further includes an integral cart clamp actuator for rotating said movable clamping jaw away from said stationary clamping jaw.

10. The clipboard according to claim 9, wherein said movable clamp jaw has inner gripping surfaces.

11. The clipboard according to claim 10, wherein said movable clamping jaw and said stationary clamping jaw are dimensioned to clamp onto a shopping cart handle.

12. A clipboard, comprising:

a dry-erase board having a board clip for retaining at least one piece of paper;

an upper board connected to said dry-erase board by a board hinge;

a marker holder attached to said dry-erase board;

a cart clamp attached to the top of said upper board;

a cart clamp magnet mounted on the back of said cart clamp; and, a central magnet attached to the rear of said dry-erase board, said central magnet located and configured such that said central magnet sticks to said cart clamp magnet when said upper board is pivoted fully backwards.

13. The clipboard according to claim 12, wherein said marker holder is comprised of back-to-back tubular members.

14. The clipboard according to claim 13, wherein said back-to-back tubular members are dimensioned to retain a dry-erase marker and an ink pen.

15. The clipboard according to claim 12, further including a plurality of surface magnets on said rear of said dry-erase board.

16. The clipboard according to claim 12, wherein said upper board is trapezoidal-shaped.

17. The clipboard according to claim 16, wherein said cart clamp includes a stationary clamping jaw, a movable clamping jaw attached to said stationary clamping jaw by a clamp hinge, and at least one clamp spring biasing said movable clamping jaw toward said stationary clamping jaw.

18. The clipboard according to claim 17, wherein said at least one clamp spring is an internal torsion spring.

19. The clipboard according to claim 18, wherein said cart clamp further includes an integral cart clamp actuator for rotating said movable clamping jaw away from said stationary clamping jaw.

20. The clipboard according to claim 19, wherein said movable clamping jaw and said stationary clamping jaw are dimensioned to clamp onto a shopping cart handle.

* * * * *